(12) United States Patent
Sato et al.

(10) Patent No.: US 9,211,886 B2
(45) Date of Patent: Dec. 15, 2015

(54) HYBRID VEHICLE DRIVE CONTROL DEVICE

(75) Inventors: Daiki Sato, Toyota (JP); Kazuyuki Shiiba, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/387,792

(22) PCT Filed: Mar. 26, 2012

(86) PCT No.: PCT/JP2012/057822
§ 371 (c)(1),
(2), (4) Date: Sep. 24, 2014

(87) PCT Pub. No.: WO2013/145103
PCT Pub. Date: Oct. 3, 2013

(65) Prior Publication Data
US 2015/0057862 A1 Feb. 26, 2015

(51) Int. Cl.
*G06F 7/00* (2006.01)
*B60W 20/00* (2006.01)
(Continued)

(52) U.S. Cl.
CPC ............... *B60W 20/10* (2013.01); *B60K 6/387* (2013.01); *B60K 6/445* (2013.01); *B60W 10/02* (2013.01);
(Continued)

(58) Field of Classification Search
CPC ..... B60W 20/10; B60W 10/02; B60W 10/08; B60W 10/196; B60K 6/387
USPC ........................................................ 701/22
See application file for complete search history.

(56) References Cited

U.S. PATENT DOCUMENTS

2003/0162617 A1* 8/2003 Minagawa ............. B60K 6/365
475/5
2004/0077448 A1* 4/2004 Oshidari ................ B60K 6/365
475/5
(Continued)

FOREIGN PATENT DOCUMENTS

JP 2004-254434 A 9/2004
JP 2005-199942 A 7/2005
(Continued)

OTHER PUBLICATIONS

International Search Report for PCT/JP2012/057822 dated Apr. 24, 2012 [PCT/ISA/210].

*Primary Examiner* — Ian Jen
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The drive control device comprises an electric motor operation control portion configured to control the first and second electric motors to generate reaction torques in a drive mode of the hybrid vehicle in which the engine is operated in an engaged state of the clutch and in a released state of the brake; and a torque assignment ratio control portion configured to control a ratio of the reaction torques to be generated by the first and second electric motors, without a change of a drive force for driving the hybrid vehicle.

3 Claims, 11 Drawing Sheets

(51) Int. Cl.
  *B60K 6/445* (2007.10)
  *B60W 10/08* (2006.01)
  *B60K 6/387* (2007.10)
  *B60W 10/02* (2006.01)
  *B60W 10/196* (2012.01)
  *G06F 17/00* (2006.01)
  *B60K 6/38* (2007.10)

(52) U.S. Cl.
  CPC ............ *B60W 10/08* (2013.01); *B60W 10/196* (2013.01); *B60W 20/1084* (2013.01); *B60K 2006/381* (2013.01); *Y02T 10/6239* (2013.01); *Y10S 903/93* (2013.01)

(56) References Cited

U.S. PATENT DOCUMENTS

| | | | | |
|---|---|---|---|---|
| 2004/0251067 A1* | 12/2004 | Gray, Jr. | ............ | B60K 6/12 180/165 |
| 2005/0102082 A1* | 5/2005 | Joe | ............ | B60K 6/445 701/54 |
| 2005/0107199 A1* | 5/2005 | Minagawa | ............ | B60K 6/365 475/5 |
| 2005/0133286 A1* | 6/2005 | Oshidari | ............ | B60K 6/26 180/65.225 |
| 2005/0272550 A1* | 12/2005 | Kroppe | ............ | B60G 17/0162 475/116 |
| 2006/0017414 A1* | 1/2006 | Joe | ............ | B60K 6/445 318/432 |
| 2006/0289212 A1* | 12/2006 | Haruhisa | ............ | B60K 6/445 180/65.235 |
| 2007/0021257 A1* | 1/2007 | Klemen | ............ | B60K 6/40 475/5 |
| 2007/0265128 A1* | 11/2007 | Conlon | ............ | B60K 6/365 475/5 |
| 2008/0064550 A1* | 3/2008 | Holmes | ............ | B60K 6/365 475/5 |
| 2009/0288895 A1* | 11/2009 | Klemen | ............ | B60K 6/365 180/65.25 |
| 2010/0009805 A1* | 1/2010 | Bachmann | ............ | B60K 6/365 477/5 |
| 2011/0218070 A1* | 9/2011 | Mack | ............ | B60K 1/00 475/150 |
| 2013/0282213 A1* | 10/2013 | Park | ............ | B60W 10/06 701/22 |
| 2014/0142795 A1* | 5/2014 | Akebono | ............ | B60K 6/48 701/22 |
| 2014/0171261 A1* | 6/2014 | Haneda | ............ | B60K 6/42 477/5 |
| 2014/0194238 A1 | 7/2014 | Ono et al. | | |

FOREIGN PATENT DOCUMENTS

| | | |
|---|---|---|
| JP | 2005-318721 A | 11/2005 |
| JP | 4038183 B2 | 1/2008 |
| JP | 2008-265600 A | 11/2008 |
| WO | 2013/014777 A1 | 1/2013 |

\* cited by examiner

|   | BK | CL | MODE |
|---|----|----|------|
| EV-1 | O |   | 1 |
| EV-2 | O | O | 2 |
| HV-1 | O |   | 3 |
| HV-2 |   | O | 4 |
| HV-3 |   |   | 5 | ism which are selectively connected to each other through a

HYBRID VEHICLE DRIVE CONTROL DEVICE

CROSS REFERENCE TO RELATED APPLICATIONS

This application is a National Stage of International Application No. PCT/JP2012/057822, filed on Mar. 26, 2012, the contents of all of which are incorporated herein by reference in their entirety.

TECHNICAL FIELD

The present invention relates to an improvement of a drive control device for a hybrid vehicle.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENTS

Patent Documents

Patent Document 1: JP-2008-265600 A1
Patent Document 2: H-4038183 B2

SUMMARY OF THE INVENTION

Object Achieved by the Invention

According to the conventional arrangement of the hybrid vehicle described above, however, a mechanism such as a planetary gear set connected to the above-described electric motor may generate a noise during running of the hybrid vehicle in a hybrid drive mode in which the above-described engine is operated. Namely, when an output torque of the electric motor is excessively small, gears in the mechanism are held in meshing engagement with each other with small forces, so that the gears may generate a butting noise due to a variation of an output torque of the engine. To solve this problem, there have been employed solutions such as changing an operating point of the engine so as not to keep the operating point in a region in which the torque of the electric motor is excessively small, and providing a sound insulating member for reducing a level of the noise to be propagated to compartments of the hybrid vehicle. However, these solutions result in other problems such as deterioration of fuel economy or an increase of weight and cost of manufacture of the hybrid vehicle. These problems were first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits reduction of generation of a noise during an operation of an engine.

Means for Achieving the Object

The object indicated above is achieved according to a first aspect of the present invention, which provides a drive control device for a hybrid vehicle provided with: a first differential mechanism and a second differential mechanism which have four rotary elements as a whole; and an engine, a first electric motor, a second electric motor and an output rotary member which are respectively connected to the above-described four rotary elements, and wherein one of the above-described four rotary elements is constituted by the rotary element of the above-described first differential mechanism and the rotary element of the above-described second differential mechanism which are selectively connected to each other through a clutch, and one of the rotary elements of the above-described first and second differential mechanisms which are selectively connected to each other through the above-described clutch is selectively fixed to a stationary member through a brake, the drive control device being characterized by controlling the above-described first and second electric motors to generate reaction torques while controlling a ratio of the reaction torques to be generated by the above-described first and second electric motors, in a drive mode of the hybrid vehicle in which the above-described engine is operated in an engaged state of the above-described clutch and in a released state of the above-described brake.

Advantages of the Invention

According to the first aspect of the invention described above, the hybrid vehicle is provided with: the first differential mechanism and the second differential mechanism which have the four rotary elements as a whole; and the engine, the first electric motor, the second electric motor and the output rotary member which are respectively connected to the four rotary elements. One of the above-described four rotary elements is constituted by the rotary element of the above-described first differential mechanism and the rotary element of the above-described second differential mechanism which are selectively connected to each other through the clutch, and one of the rotary elements of the above-described first and second differential mechanisms which are selectively connected to each other through the clutch is selectively fixed to the stationary member through the brake. The drive control device is configured to control the above-described first and second electric motors to generate reaction torques while controlling a ratio of the reaction torques to be generated by the above-described first and second electric motors, in a drive mode of the hybrid vehicle in which the above-described engine is operated in an engaged state of the above-described clutch and in a released state of the above-described brake. According to this first aspect of the invention, the drive control device configured to control the reaction torques of the above-described first and second electric motors permits gears of the differential mechanisms to be held in meshing engagement with each other, with forces large enough to effectively reduce generation of a butting noise due to a variation of a torque of the engine, in a hybrid drive mode in which the above-described engine is operated. Namely, the present invention provides a drive control device for a hybrid vehicle, which permits reduction of generation of a noise during an operation of the engine.

According to a second aspect of the invention, the drive control device according to the first aspect of the invention is configured such that the ratio of the reaction torques to be generated by the above-described first and second electric motors is controlled such that at least one of the reaction torques of the above-described first and second electric motors is outside a predetermined range of generation of a noise, which range includes zero. According to this second aspect of the invention, it is possible to prevent, in a highly practical manner, an excessively small value of the torque of the at least one of the electric motors in the hybrid drive mode in which the above-described engine is operated, so that the generation of the butting noise due to a variation of the engine torque can be effectively reduced.

According to a third aspect of the invention, the drive control device according to the first or second aspect of the invention is configured such that the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and wherein the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to the stationary member. According to this third aspect of the invention, it is possible to reduce the generation of a noise during an operation of the engine in the drive system of the hybrid vehicle having a highly practical arrangement.

MODE FOR CARRYING OUT THE INVENTION

Figure 1:
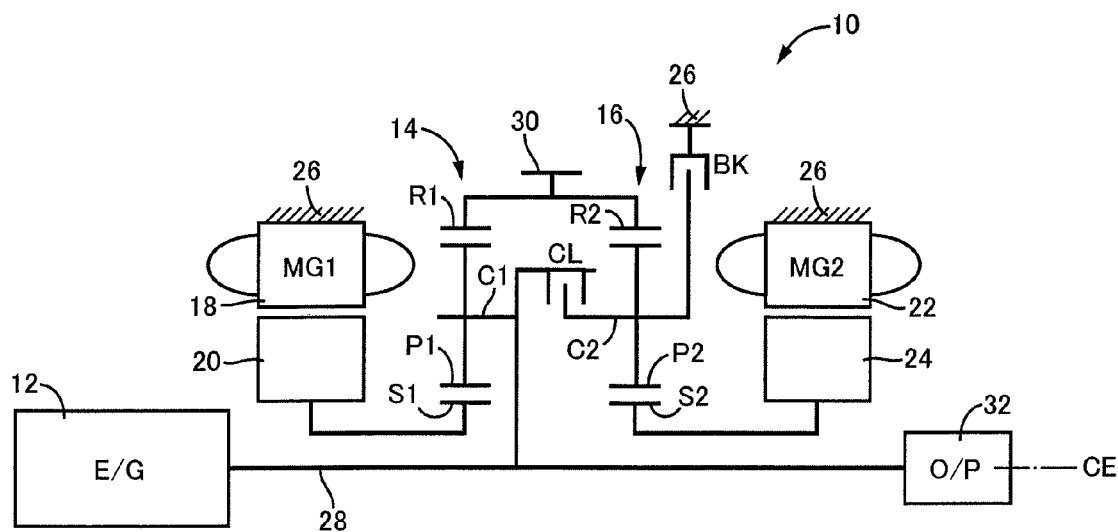
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, and the engine, the first electric motor, the second electric motor and the output rotary member which are connected to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source while the engine is held at rest include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy as needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which is provided with rotary elements (elements) consisting of: a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio $\rho 2$ and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
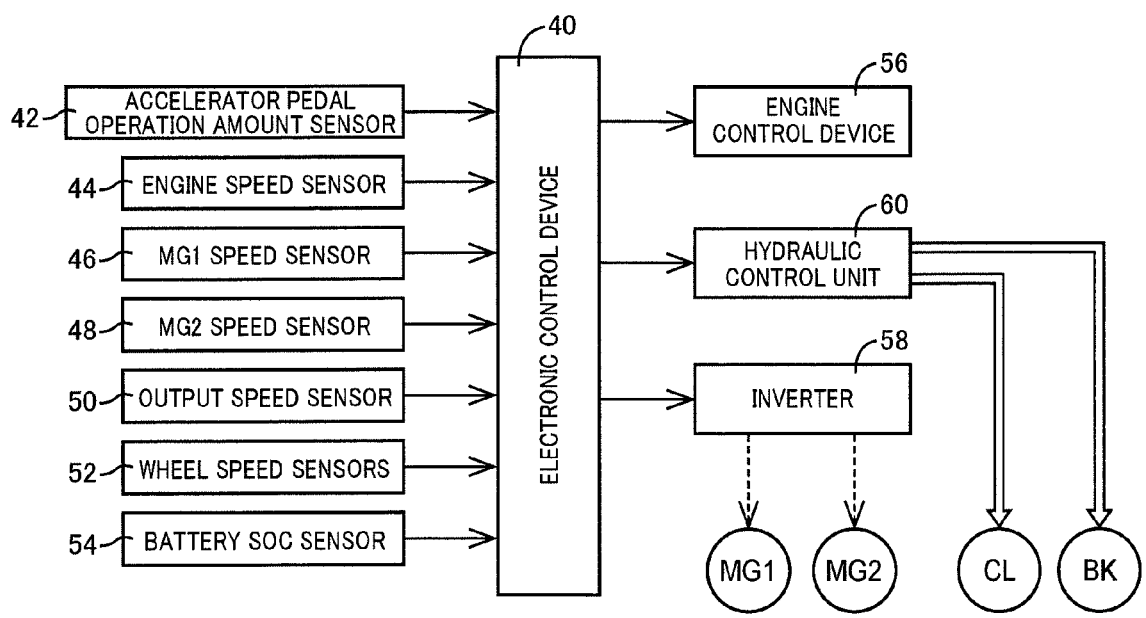
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of wheels in the drive system 10; and an output signal of a battery SOC sensor 54 indicative of a stored electric energy amount (state of charge) SOC of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $θ_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and MG2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
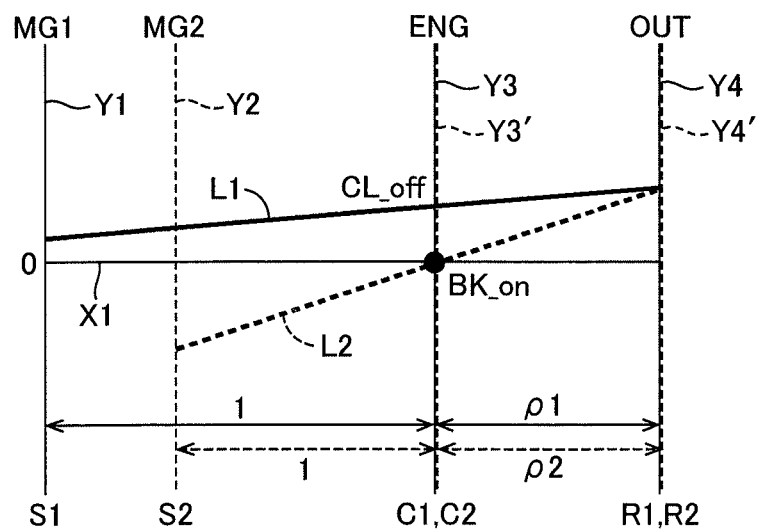
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios $\rho$ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios $\rho 1$ and $\rho 2$ of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "$\rho 1$". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "$\rho 2$". In the drive system 10, the gear ratio $\rho 2$ of the second planetary gear set 16 is higher than the gear ratio $\rho 1$ of the first planetary gear set 14 ($\rho 2 > \rho 1$). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

Figure 5:
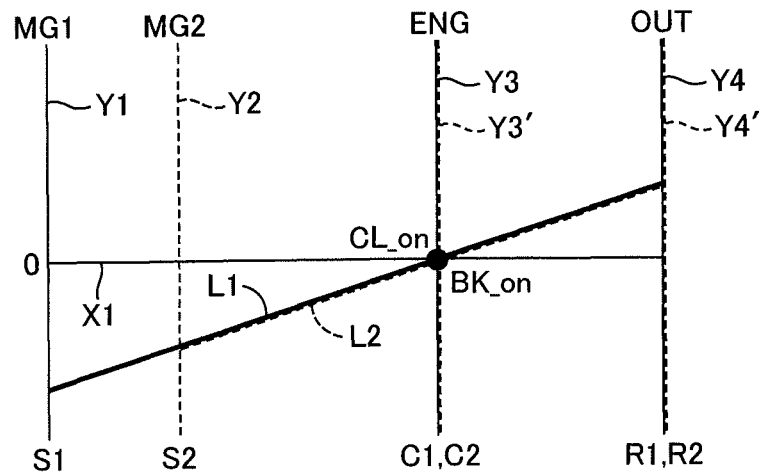
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy.

Figure 6:
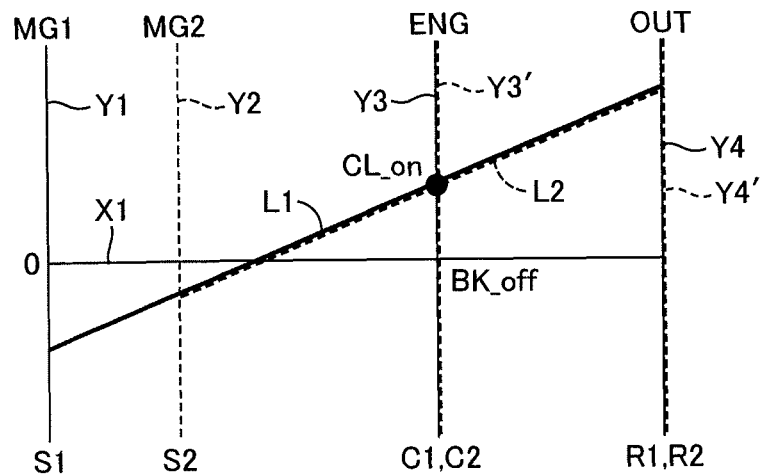
FIG. 6 is a collinear chart having straight lines which permit indication thereon of relative rotating speeds of various rotary elements of the drive system of FIG. 1, the collinear chart corresponding to the mode 4 of FIG. 3.

FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho 1$ and $\rho 2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho 1$ and $\rho 2$. Accordingly, the drive system 10 is configured such that the gear ratio $\rho 2$ of the second planetary gear set 16 is higher than the gear ratio $\rho 1$ of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, in other words, the amounts of work to be assigned to the first and second electric motors MG1 and MG2 to receive the reaction force can be adjusted with respect to each other, so that each of the first and second electric motors MG1 and MG2 can be operated at an operating point assuring a relatively high degree of operating efficiency, and/or with a reduced degree of torque limitation due to heat generation. That is, the first and second electric motors MG1 and MG2 can be operated to generate a reaction torque for transmitting the output of the engine 12 to the output gear 30, and a ratio of a portion of the reaction torque to be generated by the first electric motor MG1 to the remaining portion of the reaction torque to be generated by the second electric motor MG2 can be changed. For example, one of the first electric motor MG1 and second electric motor MG2 which is operable with a higher degree of operating efficiency is preferentially operated to receive the reaction force, so that the overall operating efficiency can be improved. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 7:
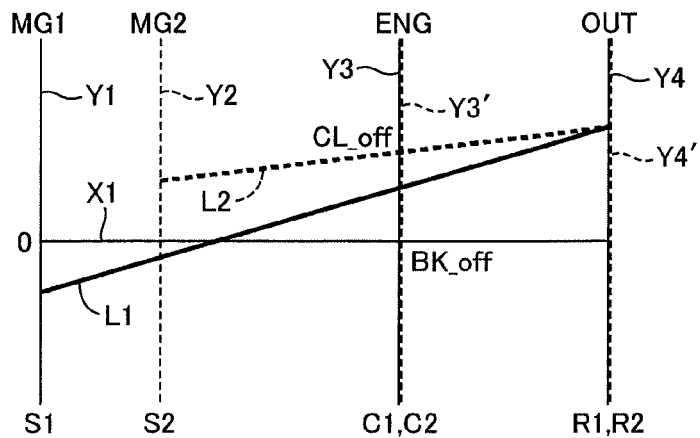
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (drive mode 5) of the drive system 10, which is preferably the hybrid drive mode in which the engine 12 is operated as the vehicle drive power source while the first electric motor MG1 is operated as needed to generate a vehicle drive force and/or an electric energy. In this mode 5, the engine 12 and first electric motor MG1 may be operated to generate a vehicle drive force, with the second electric motor MG2 being disconnected from a drive system. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
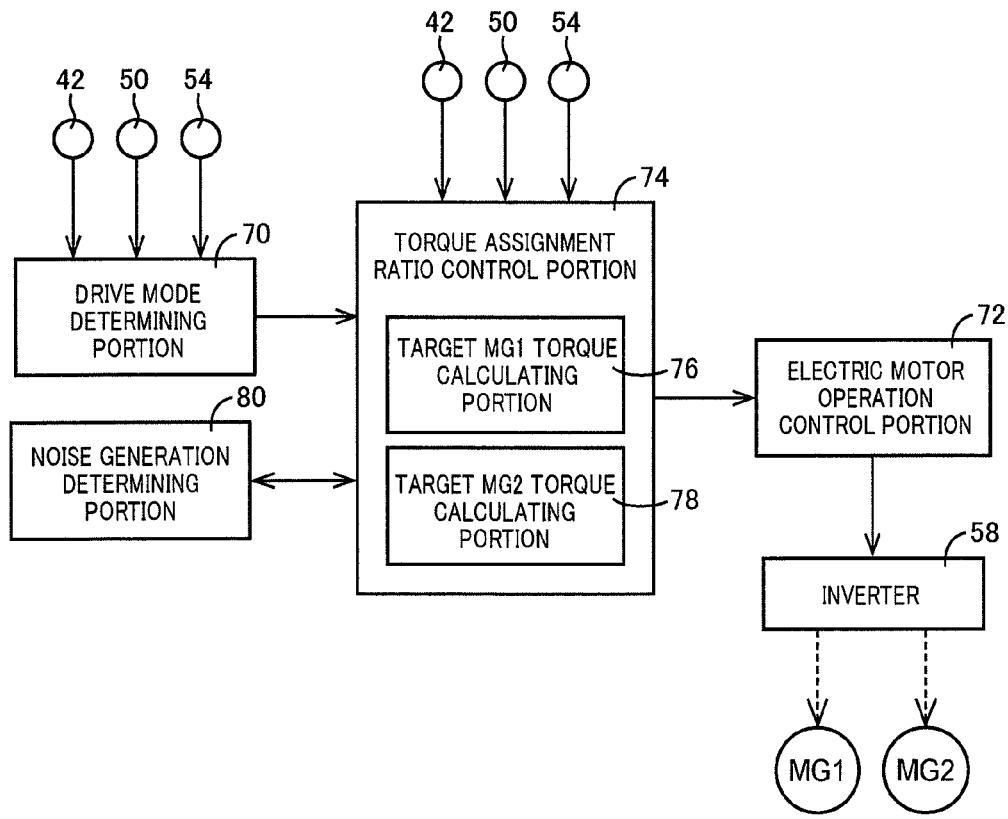
FIG. 8 is a functional block diagram for explaining major control functions of an electronic control device of FIG. 2.

FIG. 8 is the functional block diagram for explaining major control functions of the electronic control device 40. A drive mode determining portion 70 shown in FIG. 8 is configured to determine one of the drive modes of the drive system 10 to be established. The drive mode determining portion 70 is basically configured to select one of the modes 1-5 described above by reference to FIG. 3, according to a predetermined relationship and on the basis of the accelerator pedal operation amount $A_{CC}$ detected by the accelerator pedal operation amount sensor 42, the vehicle running speed V corresponding to the output speed $N_{OUT}$ detected by the output speed sensor 50, and the stored electric energy amount SOC detected by the battery SOC sensor 54, for example. Preferably, the drive mode determining portion 70 selects one of the hybrid drive modes in the form of the modes 3-5 in which the engine 12 is operated as the vehicle drive power source, when the stored electric energy amount SOC detected by the battery SOC sensor 54 is smaller than a predetermined threshold value. Preferably, the drive mode determining portion 70 selects the EV drive mode in the form of the mode 1 or mode 2 in which the engine 12 is held at rest, when the stored electric energy amount SOC detected by the battery SOC sensor 54 is equal to or larger than the predetermined threshold value. Upon starting of the hybrid vehicle, namely, upon a releasing action of a brake pedal not shown (from the operated position to the non-operated position) when the vehicle running speed V corresponding to the output speed $N_{OUT}$ detected by the output speed sensor 50 is zero while the stored electric energy amount SOC detected by the battery SOC sensor 54 is not smaller than the predetermined threshold value, for instance, the drive mode determining portion 70 selects the EV drive mode in the form of the mode 1 in which the engine 12 is held at rest while the first electric motor MG1 is primarily used as the vehicle drive power source. The drive mode determining portion 70 determines one of the drive modes according to the specific running state of the hybrid vehicle provided with the drive system 10, so as to improve the transmission efficiency and the fuel economy of the engine 12.

An electric motor operation control portion 72 is configured to control the first electric motor MG1 and the second electric motor MG2 through the inverter 58. Described specifically, the electric motor operation control portion 72 controls electric energies to be supplied from the battery not shown, to the first and second electric motors MG1 and MG2 through the inverter 58, so that the first and second electric motors MG1 and MG2 generate required outputs, that is, target torques (target electric motor torques). When the first and second electric motors MG1 and MG2 are operated to generate electric energies, the electric motor operation control portion 72 operates to store the electric energies generated by the first and second electric motors MG1 and MG2, in the battery through the inverter 58.

A torque assignment ratio control portion 74 is configured to control a ratio of the torque to be generated by the first electric motor MG1 to the torque to be generated by the second electric motor MG2, when the first and second electric motors MG1 and MG2 are both operated. For instance, the torque assignment ratio control portion 74 controls the ratio of the torques to be generated by the first and second electric motors MG1 and MG2 to generate the reaction force corresponding to the output of the engine 12, in the mode 4 in which the engine 12 is operated and the clutch CL is placed in the engaged state while the brake BK is placed in the released state, for example. To implement this torque assignment ratio control, the torque assignment ratio control portion 74 includes a target MG1 torque calculating portion 76 for calculating a target torque $T_{MG1}*$ of the first electric motor MG1 (target first electric motor output), and a target MG2 torque calculating portion 78 for calculating a target torque $T_{MG2}^*$ of the second electric motor MG2 (target first second electric motor output).

The torque assignment ratio control portion 74 is preferably configured to calculate a total reaction torque that should be generated by the first and second electric motors MG1 and MG2, namely, a total reaction torque corresponding to the output of the engine 12 required to realize an operator's required vehicle drive force to be generated by the drive system 10, on the basis of the operator's required vehicle drive force and the output torque $T_E$ of the engine 12. The torque assignment ratio control portion 74 calculates the ratio of reaction torques to be generated by the first and second electric motors MG1 and MG2 to obtain the calculated total reaction torque. For example, the operator's required vehicle drive force is calculated on the basis of the accelerator pedal operation amount $A_{CC}$ detected by the accelerator pedal operation amount sensor 42 and the vehicle running speed V corresponding to the output speed detected by the output speed sensor 50, and according to a predetermined relationship. For instance, the engine torque $T_E$ is calculated (estimated) on the basis of an intake air quantity QA of the engine 12 detected by an intake air quantity sensor not shown, and according to a predetermined relationship. In the mode 4, one or both of the first and second electric motors MG1 and MG2 can be operated to receive the reaction force corresponding to the output of the engine 12, as described above. Accordingly, the torque assignment ratio control portion 74 preferably controls the ratio of the reaction torques of the first and second electric motors MG1 and MG2, so as to operate the engine 12 and the first and second electric motors MG1 and MG2 at operating points of high efficiency, and to permit running of the hybrid vehicle with a reduced extent of torque limitation due to heat generation, while controlling the reaction torques of the first and second electric motors MG1 and MG2 corresponding to the output of the engine 12 required to realize the operator's required vehicle drive force. Described more specifically, the target MG1 torque calculating portion 76 calculates the target torque $T_{MG1}^*$ of the first electric motor MG1 (target first electric motor output), and the target MG2 torque calculating portion 78 calculates the target torque $T_{MG2}^*$ of the second electric motor MG2 (target second electric motor output), so that the calculated ratio of the reaction torques of the first and second electric motors MG1 and MG2 is established.

A noise generation determining portion 80 is configured to determine whether the first planetary gear set 14 or the second planetary gear set 16 generates or has a possibility of generating a noise such as a butting noise in the hybrid drive mode in which the engine 12 is operated. When the torque generated by the first electric motor MG1 is excessively small, that is, when the absolute value of the torque is close to zero, forces of meshing engagement of the gears of the first planetary gear set 14 (a force of meshing engagement of the sun gear S1 and the pinion gear P1 with each other, for instance) are small so that a butting noise may be generated due to a variation of the engine torque. Similarly, when the torque generated by the second electric motor MG2 is excessively small, that is, when the absolute value of the torque is close to zero, forces of meshing engagement of the gears of the second planetary gear set 16 (a force of meshing engagement of the sun gear S2 and the pinion gear P2 with each other, for instance) are small so that a butting noise may be generated due to a variation of the engine torque. When the torque assignment ratio control is implemented to control the reaction torques to be generated by the first and second electric motors MG1 and MG2 in the mode 4, in particular, the reaction torque of one of the electric motors MG1 and MG2 may be comparatively small and may be close to zero. Accordingly, the noise generation determining portion 80 is preferably configured to determine that there is a generation of noise or a possibility of generation of a noise, when the reaction torque of at least one of the first and second electric motors MG1 and MG2 falls within a predetermined range of noise generation, which range includes zero. The torque of each electric motor used to make this determination may be the target torque $T_{MG1}^*$ or $T_{MG2}^*$ calculated by the target MG1 torque calculating portion 76 or target MG2 torque calculating portion 78, or an estimated torque value calculated on the basis of the electric motor speed and according to a predetermined relationship. The noise generation determining portion 80 may determine (detect) a possibility of generation of a noise before the reaction torque actually falls in the predetermined range of noise generation, by estimating a probability of the electric motor torque falling in the predetermined range of noise generation, on the basis of the accelerator pedal operation amount $A_{CC}$ detected by the accelerator pedal operation amount sensor 42 or a rate of change of the electric motor torque.

Figure 9:
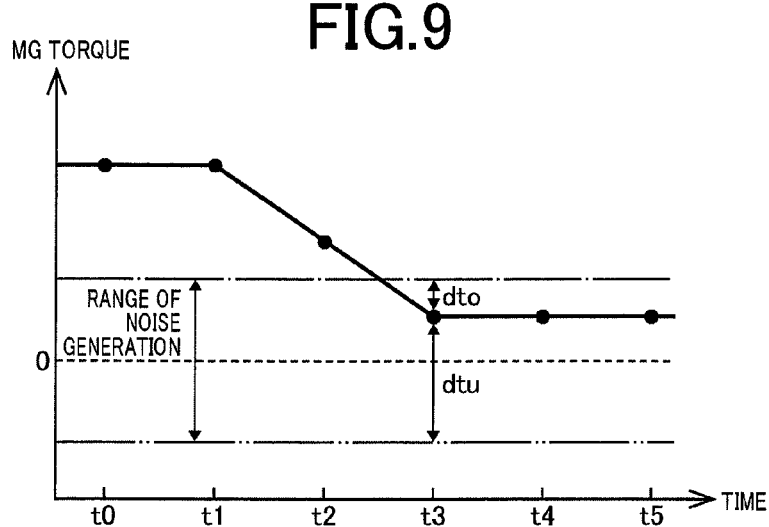
FIG. 9 is a view for explaining an example of a range of noise generation used for a determination by the electronic control device of FIG. 2.

FIG. 9 is the view for explaining an example of the range of noise generation used for the determination by the noise generation determining portion 80. Preferably, the range of noise generation is set exclusively for each of the first and second electric motors MG1 and MG2. However, FIG. 9 indicates the range of noise generation by way of example, for easier explanation. In FIG. 9, a one-dot chain line represents an upper limit of the range of noise generation, and a two-dot chain line represents a lower limit of the range, while a broken line represents the value zero of the electric motor torque. A solid line represents a change of the electric motor torque, and dots (black circles) in FIG. 9 represent points of time at which the determination by the noise generation determining portion 80 is made, that is, a control period of time. Namely, in the example of FIG. 9, the determination as to whether there is a generation of noise or a possibility of generation of a noise is made at points of time t0-t5. Preferably, the range of noise generation consists of a relatively narrow positive region from the value zero of the electric motor torque indicated by the broken line to the upper limit indicated by the one-dot chain line, and a relatively narrow negative region from the value zero to the lower limit indicated by the two-dot chain line, as shown in FIG. 9. Although the range of noise generation is preferably a fixed relationship (map) predetermined depending upon an arrangement (hardware characteristics) of the first electric motor MG1, second electric motor MG2, first planetary gear set 14, second planetary gear set 16, etc., the relationship may be calculated (determined) in a real-time fashion upon each determination by the noise generation determining portion 80, on the basis of the accelerator pedal operation amount $A_{CC}$ detected by the accelerator pedal operation amount sensor 42, the vehicle running speed V corresponding to the output speed detected by the output speed sensor 50, a transmission oil temperature detected by an oil temperature sensor not shown, a cooling water temperature of the engine 12 detected by a cooling water temperature sensor not shown. In the example of FIG. 9, the electric motor torque indicated by the solid line falls in the range of noise generation at a point of time between the points of time t2 and t3. In this case, a generation of noise or a possibility of generation of a noise is determined (detected) at the point of time t3.

When the noise generation determining portion 80 has determined that there is a generation of noise or a possibility of generation of a noise, the torque assignment ratio control portion 74 changes (adjusts) the ratio of the reaction torques to be generated by the first and second electric motors MG1 and MG2. Preferably, the torque assignment ratio control portion 74 controls the ratio of the reaction torques of the first and second electric motors MG1 and MG2 such that at least one of the reaction torques of the first and second electric motors MG1 and MG2 is outside the range of noise generation. More preferably, the torque assignment ratio control portion 74 controls the ratio of the reaction torques of the first and second electric motors MG1 and MG2 so that both of the reaction torques of the first and second electric motors MG1 and MG2 are outside the range of noise generation. Described more specifically, the torque assignment ratio control portion 74 compensates (increases or decreases) the ratio of the reaction torques of one of the first and second electric motors MG1 and MG2, when it is determined that there is a generation of noise or a possibility of generation of a noise by the above-indicated one electric motor MG1 or MG2, and adjusts the reaction torque of the other electric motor to compensate for an amount of change of the reaction torque of the above-indicated one electric motor, so that the output drive force of the output gear 30 coincides with the operator's required vehicle drive force. If the reaction torque of one of the electric motors is compensated, an amount of this compensation multiplied by a conversion value (a coefficient for conversion from the side of one of the electric motors to the side of the other electric motor) according to the gear ratios of the first and second planetary gear sets 14 and 16 is added to the reaction torque of the other electric motor, so that the output drive force of the output gear 30 is held constant.

When the noise generation determining portion 80 has determined that there is a generation of noise or a possibility of generation of a noise, each of the target MG1 torque calculating portion 76 and the target MG2 torque calculating portion 78 preferably calculates differences between the presently detected electric motor torque (first electric motor torque $T_{MG1}$ or second electric motor torque $T_{MG2}$) and upper and lower limits of the range of noise generation, and sets, as the target torque, one of the upper and lower limits the calculated difference with respect to which is smaller. Namely, each of the target MG1 and MG2 torque calculating portions 76 and 78 sets the upper limit as the compensated target torque of the electric motor, if the difference between the presently detected electric motor torque and the upper limit of the range of noise generation is smaller than that between the presently detected electric motor torque and the lower limit, and sets the lower limit as the compensated target torque of the electric motor, if the difference between the presently detected electric motor torque and the upper limit of the range of noise generation is larger than the difference between the presently detected electric motor torque and the lower limit. In the example of FIG. 9 in which it is determined at the point of time t3 that the detected electric motor torque falls within the range of noise generation, the difference dto between the electric motor torque at the point of time t3 and the upper limit of the range of noise generation, and the difference dtu between the electric motor torque and the lower limit are compared with each other. Since the difference dto with respect to the upper limit represented by the one-dot chain line in FIG. 9 is smaller, the upper limit is set as the compensated target torque of the electric motor when it is determined at the point of time t3 that the detected electric motor torque falls within the range of noise generation. According to the thus set compensated target torque, the ratio of the torques of the two electric motors may be compensated depending upon the stored electric energy amount SOC detected by the battery SOC sensor 54, or the charging and discharging limits of the battery, for example. Where the stored electric energy amount SOC is comparatively large and close to the charging upper limit value, for instance, the ratio of the torques of the first and second electric motors MG1 and MG2 may be adjusted so that the operations of the two motors are controlled so as to discharge the battery (so as to reduce the generated electric energy amount).

The electric motor operation control portion 72 controls the operations of the first and second electric motors MG1 and MG2 on the basis of the ratio of the torques calculated by the torque assignment ratio control portion 74. That is, the electric motor operation control portion 72 controls the operations of the first and second electric motors MG1 and MG2 through the inverter 58, so as to establish the target first electric motor torque $T_{MG1}*$ and the target second electric motor torque $T_{MG2}*$ calculated by the target MG1 torque calculating portion 76 and the target MG2 torque calculating portion 78. Where at least one of the target torques of the two electric motors is changed by the target MG1 torque calculating portion 76 and/or the target MG2 torque calculating portion 78, the electric motor operation control portion 72 may control the operations of the two electric motors such that a rate of change (an amount of change per unit time) of the electric motor torque is not higher than a predetermined value so as to reduce further generation of a noise such as a butting noise due to an abrupt variation of the electric motor torque. Where the torques of both of the first and second electric motors MG1 and MG2 fall within the range of noise generation, it is preferable that the target torque of the electric motor whose presently detected torque first falls within the range of noise generation is compensated (changed to be outside the range), and the target torque of the other electric motor is then compensated according to the amount of compensation of the target torque of the electric motor whose torque first falls within the range, so that the torques of the two electric motors are outside the range of noise generation.

Figure 10:
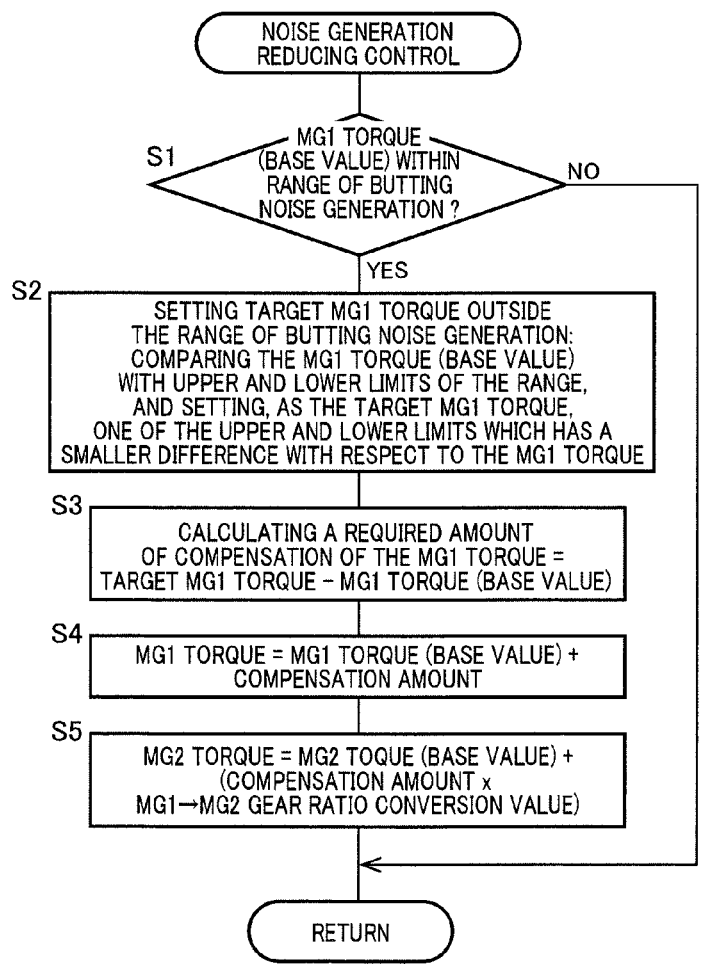
FIG. 10 is a flow chart for explaining a major portion of an example of a noise generation reducing control implemented by the electronic control device of FIG. 2.

FIG. 10 is the flow chart for explaining a major portion of an example of a noise generation reducing control implemented by the electronic control device 40. The noise generation reducing control is repeatedly implemented with a predetermined cycle time. The following description refers to a case where the output torque of the first electric motor MG1 falls within the range of noise generation, by way of example. Where the output torque of the second electric motor MG2 falls within the range of noise generation, the first electric motor MG1 described in the flow chart of FIG. 10 should be replaced by the second electric motor MG2. The same applies to the flow chart of FIG. 11 referred to below.

The noise generation reducing control is initiated with step S1 ("step" being hereinafter omitted), to determine whether the torque $T_{MG1}$ (base value) of the first electric motor MG1 falls within the predetermined range of noise generation. If a negative determination is obtained in S1, the present routine is terminated. If an affirmative determination is obtained in S1, on the other hand, the control flow goes to S2 to set the target torque $T_{MG1}*$ so that the torque $T_{MG1}$ is outside the range of noise generation. For example, the differences of the first electric motor torque $T_{MG1}$ with respect to the upper and lower limits of the range of noise generation are calculated, and one of the upper and lower limits the difference with respect to which is smaller is set as the target torque $T_{MG1}*$. Then, the control flow goes to S3 to calculate a required amount of compensation of the torque of the first electric motor MG1, on the basis of the target torque $T_{MG1}*$ calculated in S2. Namely, a difference between the target torque $T_{MG1}*$ calculated in S2 and the first electric motor torque $T_{MG1}$ (base value) is calculated. The control flow then goes to S4 to add the amount of compensation calculated in S3 to the torque value $T_{MG1}$ (base value), to update the torque of the first electric motor MG1. Then, the control flow goes to S5 to add the compensation amount calculated in S3 multiplied by the conversion value (coefficient for conversion from the first electric motor side to the second electric motor side) according to the gear ratios of the first and second planetary gear sets 14 and 16, to the torque $T_{MG2}$ (base value) of the second electric motor MG2, to update the torque of the second electric motor MG2. Then, the present routine is terminated.

Figure 11:
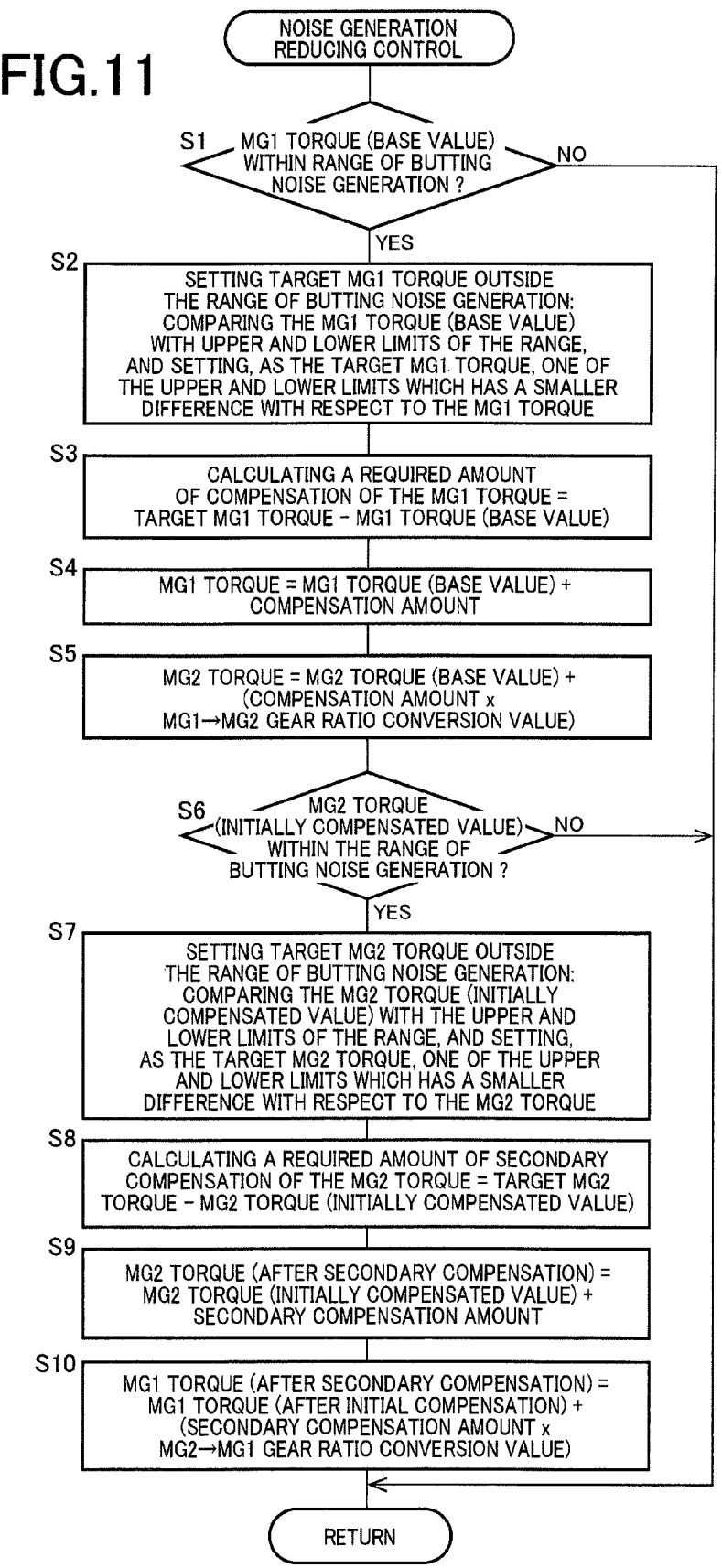
FIG. 11 is a flow chart for explaining a major portion of another example of the noise generation reducing control implemented by the electronic control device of FIG. 2.
Figure 12:
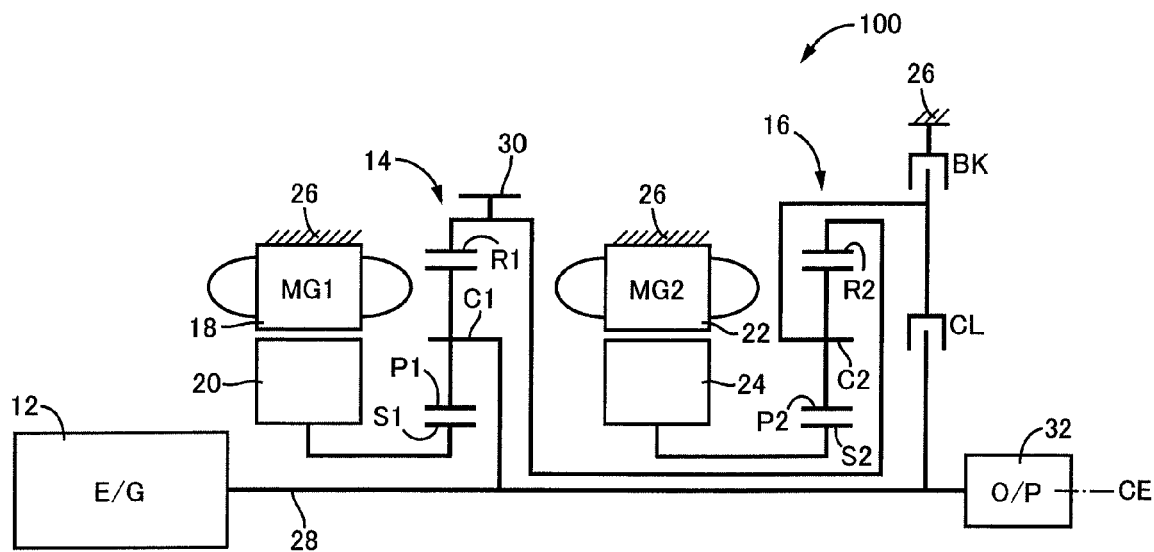
FIG. 12 is a schematic view for explaining an arrangement of a hybrid vehicle drive system according to another preferred embodiment of this invention.
Figure 13:
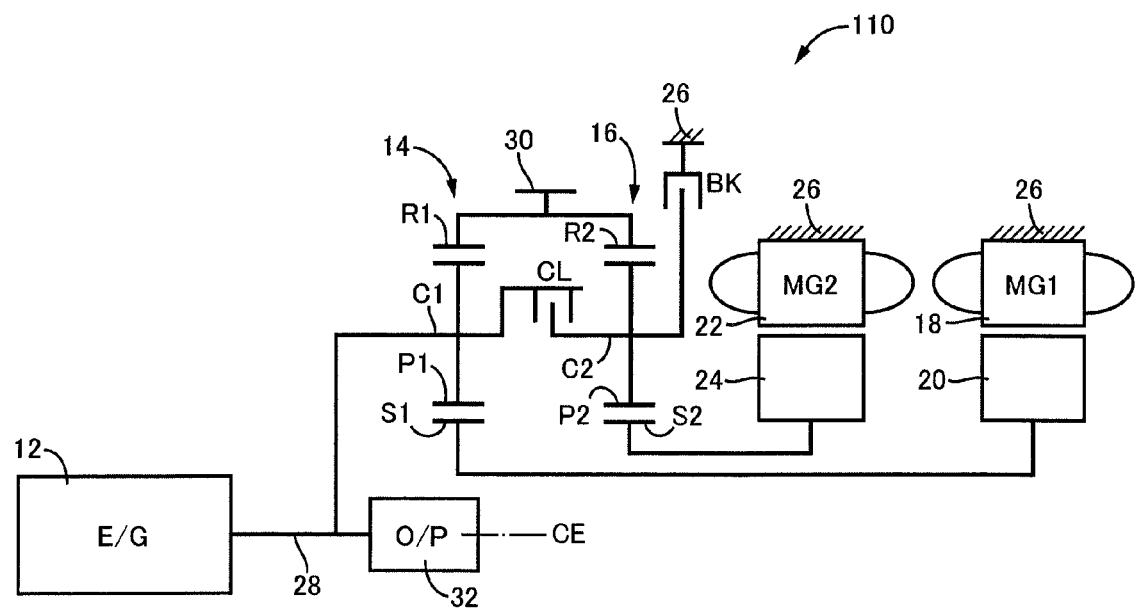
FIG. 13 is a schematic view for explaining an arrangement of a hybrid vehicle drive system according to a further preferred embodiment of this invention.
Figure 14:
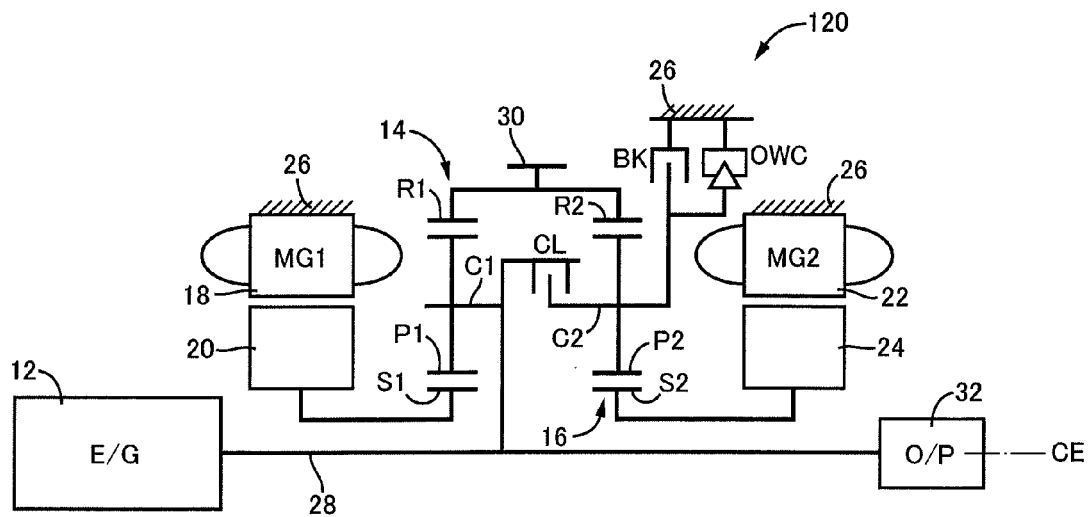
FIG. 14 is a schematic view for explaining an arrangement of a hybrid vehicle drive system according to a still further preferred embodiment of this invention.
Figure 15:
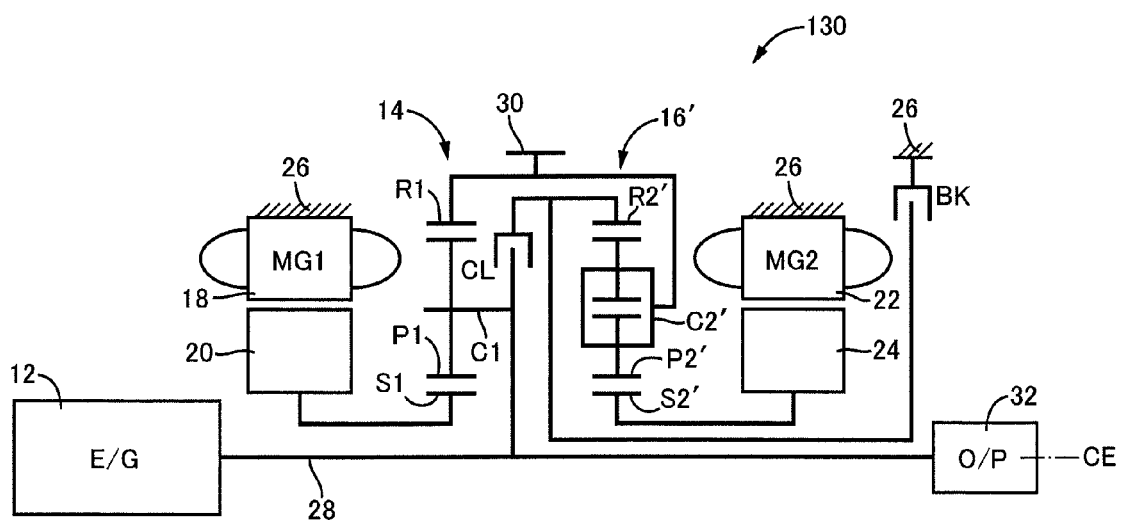
FIG. 15 is a schematic view for explaining an arrangement of a hybrid vehicle drive system according to a yet further preferred embodiment of this invention.
Figure 16:
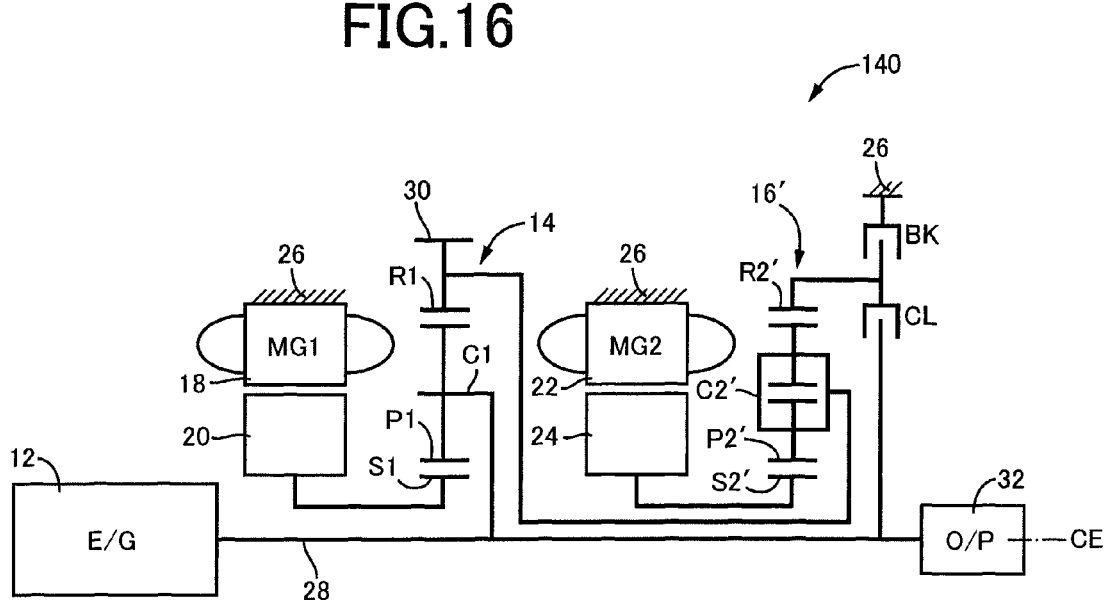
FIG. 16 is a schematic view for explaining an arrangement of a hybrid vehicle drive system according to still another preferred embodiment of this invention.

FIG. 11 is the flow chart for explaining a major portion of another example of the noise generation reducing control implemented by the electronic control device 40. This noise generation reducing control is repeatedly implemented with a predetermined cycle time. In FIG. 11, the same numbers as used in FIG. 10 are used to identify the same steps, which will not be described redundantly.

In the noise generation reducing control of FIG. 11, S5 is followed by S6 to determine whether the torque $T_{MG2}$ (compensated value calculated in S5) of the second electric motor MG2 falls within the predetermined range of noise generation. If a negative determination is obtained in S6, the present routine is terminated. If an affirmative determination is obtained in S6, on the other hand, the control flow goes to S7 to set the target torque $T_{MG2}^*$ of the second electric motor MG2 so that the torque $T_{MG2}$ is outside the range of noise generation. For example, the differences of the second electric motor torque $T_{MG2}$ (compensated value) with respect to the upper and lower limits of the range of noise generation are calculated, and one of the upper and lower limits the difference with respect to which is smaller is set as the target torque $T_{MG2}^*$. Then, the control flow goes to S8 to calculate a required amount of secondary compensation of the torque of the second electric motor MG2, on the basis of the target torque $T_{MG2}^*$ calculated in S7. Namely, a difference between the target torque $T_{MG2}^*$ calculated in S7 and the second electric motor torque $T_{MG2}$ (initially compensated value) is calculated. The control flow then goes to S9 to add the amount of secondary compensation calculated in S8 to the torque value $T_{MG2}$ (initially compensated value), to update the torque of the second electric motor MG2. Then, the control flow goes to S10 to add the secondary compensation amount calculated in S8 multiplied by the conversion value (coefficient for conversion from the second electric motor side to the first electric motor side) according to the gear ratios of the first and second planetary gear sets 14 and 16, to the torque $T_{MG1}$ (initially compensated value, namely, value after the secondary compensation in S4) of the first electric motor MG1, to update the torque of the first electric motor MG1. Then, the present routine is terminated.

It will be understood from the foregoing description by reference to FIGS. 10 and 11 that S4, S5, S9 and S10 correspond to the operation of the electric motor operation control portion 72, while S2, S3, S7 and S8 correspond to the operation of the torque assignment ratio control portion 74, and that S2 corresponds to the operation of the target MG1 torque calculating portion 76, and S7 corresponds to the operation of the target MG2 torque calculating portion 78, while S1 and S6 correspond to the operation of the noise generation determining portion 80.

Other preferred embodiments of the present invention will be described in detail by reference to the drawings. In the following description, the same reference signs will be used to identify the same elements in the different embodiments, which will not be described redundantly.

Second Embodiment

Figure 17:
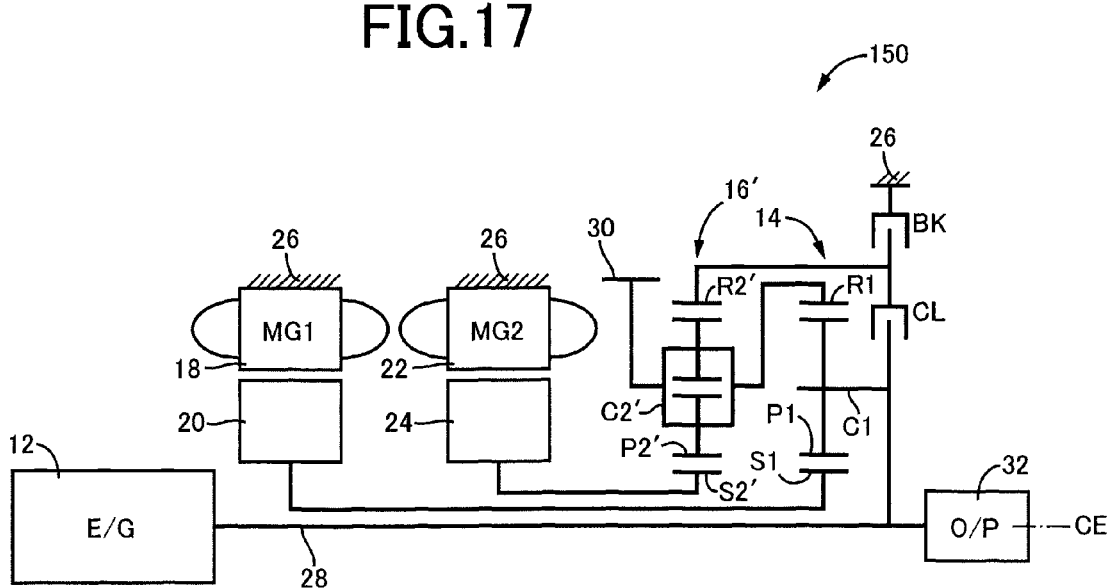
FIG. 17 is a schematic view for explaining an arrangement of a hybrid vehicle drive system according to yet another preferred embodiment of this invention.

FIGS. 12-17 are the schematic views for explaining arrangements of hybrid vehicle drive systems 100, 110, 120, 130, 140 and 150 according to another preferred embodiment of this invention. The present invention is equally applicable to the drive system 100 shown in FIG. 12 and the drive system 110 shown in FIG. 13, which have respective different orders of arrangement (position) of the first electric motor MG1, first planetary gear set 14, second electric motor MG2, second planetary gear set 16, clutch CL and brake BK, in the direction of the center axis CE. The prevent invention is also equally applicable to the drive system 120 shown in FIG. 14, wherein a one-way clutch OWC is disposed in parallel with the brake BK, between the carrier C2 of the second planetary gear set 16 and the stationary member in the form of the housing 26, such that the one-way clutch OWC permits a rotary motion of the carrier C2 relative to the housing 26 in one of opposite directions, and inhibits a rotary motion of the carrier C2 in the other direction. Each of the drive system 130 shown in FIG. 15, the drive system 140 shown in FIG. 16 and the drive system 150 shown in FIG. 17 is provided with a second differential mechanism in the form of a double-pinion type second planetary gear set 16', in place of the single-pinion type second planetary gear set 16. This second planetary gear set 16' is provided with rotary elements (elements) consisting of; a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Third Embodiment

Figure 18:
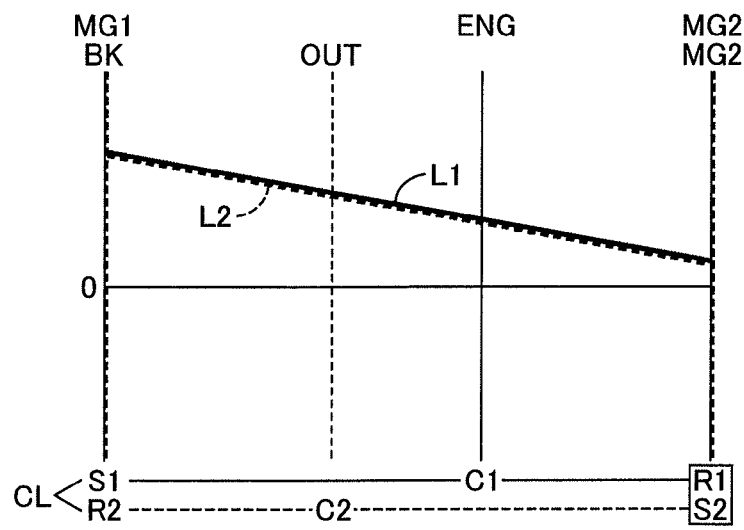
FIG. 18 is a collinear chart for explaining an arrangement and an operation of a hybrid vehicle drive system according to another preferred embodiment of this invention.
Figure 19:
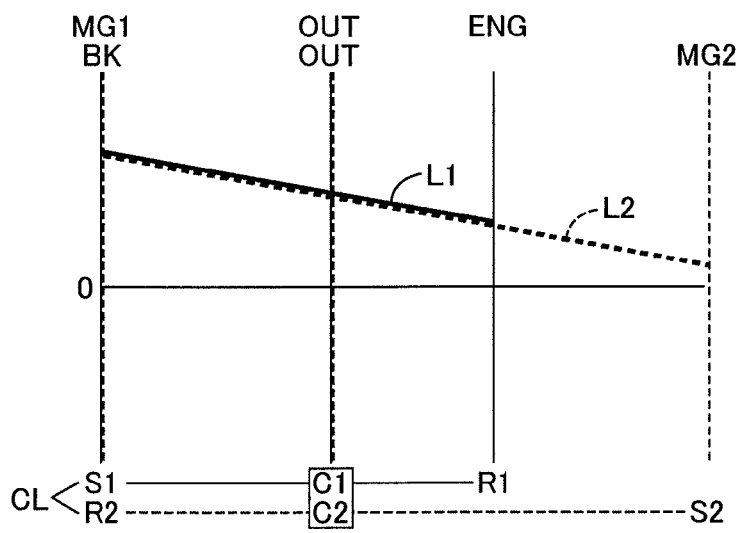
FIG. 19 is a collinear chart for explaining an arrangement and an operation of a hybrid vehicle drive system according to a further preferred embodiment of this invention.
Figure 20:
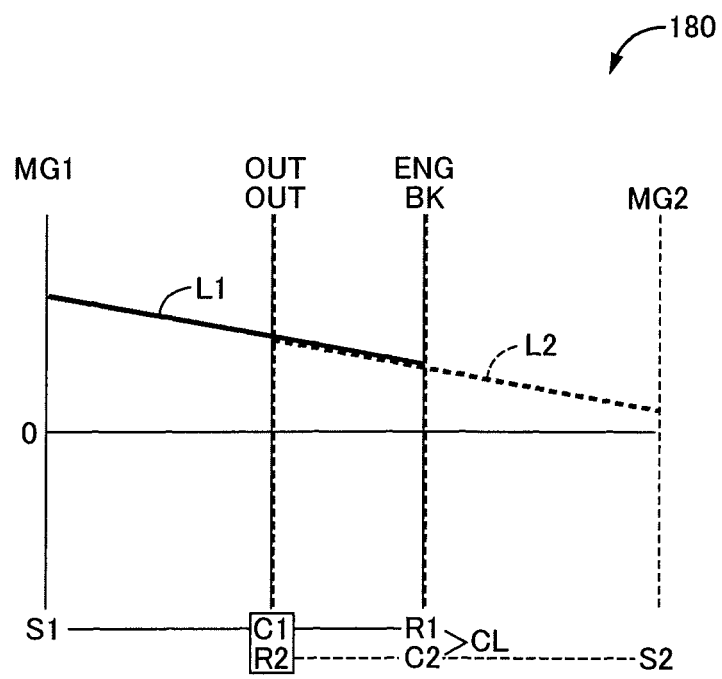
FIG. 20 is a collinear chart for explaining an arrangement and an operation of a hybrid vehicle drive system according to a still further preferred embodiment of this invention.

FIGS. 18-20 are the collinear charts for explaining arrangements and operations of respective hybrid vehicle drive systems 160, 170 and 180 according to other preferred embodiments of this invention in place of the drive system 10. In FIGS. 18-20, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the drive system 160 for the hybrid vehicle shown in FIG. 18, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The ring gear R1 and the sun gear S2 are connected to each other. In the drive system 170 for the hybrid vehicle shown in FIG. 19, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The carriers C1 and C2 are connected to each other. In the drive system 180 for the hybrid vehicle shown in FIG. 20, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL. The carrier C1 and ring gear R2 are connected to each other.

The drive systems for the hybrid vehicle shown in FIGS. 18-20 are identical with each other in that each of these drive systems for the hybrid vehicle is provided with the first differential mechanism in the form of the first planetary gear set 14 and the second differential mechanism in the form of the second planetary gear set 16, 16', which have four rotary elements (whose relative rotating speeds are represented) in the collinear chart, and is further provided with the first electric motor MG1, second electric motor MG2, engine 12 and output rotary member (output gear 30) which are connected to the respective four rotary elements, and wherein one of the four rotary elements is constituted by the rotary element of the first planetary gear set 14 and the rotary element of the second planetary gear set 16, 16' which are selectively connected to each other through the clutch CL, and the rotary element of the second planetary gear set 16, 16' selectively connected to the rotary element of the first planetary gear set 14 through the clutch CL is selectively fixed to the stationary member in the form of the housing 26 through the brake BK, as in the drive system for the hybrid vehicle shown in FIGS. 4-7. Namely, the hybrid vehicle drive control device of the present invention described above by reference to FIG. 8 and the other figures is suitably applicable to the drive systems shown in FIGS. 18-20.

As described above, the illustrated embodiments are configured such that the hybrid vehicle is provided with: the first differential mechanism in the form of the first planetary gear set 14 and the second differential mechanism in the form of the second planetary gear set 16, 16' which have the four rotary elements as a whole when the clutch CL is placed in the engaged state (and thus the first planetary gear set 14 and the second planetary gear set 16, 16' are represented as the four rotary elements in the collinear charts such as FIGS. 4-7); and the engine 12, the first electric motor MG1, the second electric motor MG2 and the output rotary member in the form of the output gear 30 which are respectively connected to the four rotary elements. One of the four rotary elements is constituted by the rotary element of the above-described first differential mechanism and the rotary element of the above-described second differential mechanism which are selectively connected to each other through the clutch CL, and one of the rotary elements of the first and second differential mechanisms which are selectively connected to each other through the clutch CL is selectively fixed to the stationary member in the form of the housing 26 through the brake BK. The drive control device is configured to control the first and second electric motors MG1 and MG2 to generate reaction torques while controlling a ratio of the reaction torques to be generated by the first and second electric motors MG1 and MG2, in the mode 4 (HV-2) of the hybrid vehicle in which the engine 12 is operated in the engaged state of the clutch CL and in the released state of the brake BK. Accordingly, the drive control device configured to control the reaction torques of the above-described first and second electric motors MG1 and MG2 permits the gears of the differential mechanisms 14, 16 (16') to be held in meshing engagement with each other, with forces large enough to effectively reduce generation of a butting noise due to a variation of a torque of the engine, in the hybrid drive mode in which the engine 12 is operated. Namely, the present invention provides a drive control device in the form of the electronic control device 40 for a hybrid vehicle, which permits reduction of generation of a noise during an operation of the engine.

The drive control device is configured such that the ratio of the reaction torques to be generated by the first and second electric motors MG1 and MG2 is controlled such that at least one of the reaction torques of the first and second electric motors MG1 and MG2 is outside the predetermined range of generation of a noise, which range includes zero. Accordingly, it is possible to prevent, in a highly practical manner, an excessively small value of at least one of the torques of the electric motors in the hybrid drive mode in which the engine 12 is operated, so that the generation of the butting noise due to a variation of the engine torque can be effectively reduced.

The first planetary gear set 14 is provided with a first rotary element in the form of the sun gear S1 connected to the first electric motor MG1, a second rotary element in the form of the carrier C1 connected to the engine 12, and a third rotary element in the form of the ring gear R1 connected to the output gear 30, while the second planetary gear set 16 (16') is provided with a first rotary element in the form of the sun gear S2 (S2') connected to the second electric motor MG2, a second rotary element in the form of the carrier C2 (C2'), and a third rotary element in the form of the ring gear R2 (R2'), one of the carrier C2 (C2') and the ring gear R2 (R2') being connected to the ring gear R1 of the first planetary gear set 14. The clutch CL is configured to selectively connect the carrier C1 of the first planetary gear set 14 and the other of the carrier C2 (C2') and the ring gear R2 (R2') which is not connected to the ring gear R1, to each other, while the brake BK is configured to selectively fix the other of the carrier C2 (C2') and the ring gear R2 (R2') which is not connected to the ring gear R1, to a stationary member in the form of the housing 26. Accordingly, it is possible to reduce the noise generation during an operation of the engine in the drive system 10 of the hybrid vehicle having a highly practical arrangement.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150, 160, 170, 180: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
32: Oil pump 40: Electronic control device (Drive control device)
42: Accelerator pedal operation amount sensor 44: Engine speed sensor
46: MG1 speed sensor 48: MG2 speed sensor 50: Output speed sensor
52: Wheel speed sensors 54: Battery SOC sensor
56: Engine control device 58: Inverter 60: Hydraulic control unit
70: Drive mode determining portion
72: Electric motor operation control portion
74: Torque assignment ratio control portion
76: Target MG1 torque calculating portion
78: Target MG2 torque calculating portion
80: Noise generation determining portion BK: Brake CL: Clutch C1, C2, C2': Carrier (Second rotary element)
MG1: First electric motor MG2: Second electric motor
OWC: One-way clutch P1, P2, P2': Pinion gear
R1, R2, R2': Ring gear (Third rotary element)
S1, S2, S2': Sun gear (First rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, the drive control device comprising:
    an electric motor operation control portion configured to control said first and second electric motors to generate reaction torques in a drive mode of the hybrid vehicle in which said engine is operated in an engaged state of said clutch and in a released state of said brake; and
    a torque assignment ratio control portion configured to control a ratio of the reaction torques to be generated by said first and second electric motors, without a change of a drive force for driving the hybrid vehicle.

2. The drive control device according to claim 1, wherein said torque assignment ratio control portion controls said ratio of the reaction torques to be generated by said first and second electric motors such that at least one of the reaction torques of said first and second electric motors is outside a predetermined range of generation of a noise in said first and second differential mechanisms, which range includes zero.

3. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism,
    and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to the stationary member.

* * * * *